United States Patent [19]

Lovendahl

[11] 4,120,599
[45] Oct. 17, 1978

[54] BORING TOOL

[76] Inventor: Norman H. Lovendahl, 814 N. Clinton, River Forest, Ill. 60305

[21] Appl. No.: 793,612

[22] Filed: May 4, 1977

[51] Int. Cl.² ............................................. B23B 51/00
[52] U.S. Cl. .................................................. 408/150
[58] Field of Search .............. 408/147, 150, 151, 159, 408/180, 187; 407/89

[56] References Cited

U.S. PATENT DOCUMENTS

| | | | |
|---|---|---|---|
| 2,211,321 | 8/1940 | Eipper | 408/151 |
| 2,368,846 | 2/1945 | Klomp | 408/147 |
| 2,643,556 | 6/1953 | Briney, Jr. | 408/150 |
| 3,685,917 | 8/1972 | Patt | 408/150 |
| 4,022,539 | 5/1977 | Peuterbaugh | 408/150 |

Primary Examiner—Harrison L. Hinson
Attorney, Agent, or Firm—Alter and Weiss

[57] ABSTRACT

A single point boring tool using an eccentric for varying the radius of the cutting edge of the tool from the longitudinal axis of the tool to thereby vary the bore being machined. The holder tool can be rotated a full 360°, therefore a small eccentric can effect a relatively large variation in bore diameters. The tool holder is rotated after loosening fastener means to obtain the desired radius of bore and then locked in place by tightening the fastener means. Index markings on the tool shaft and tool holder enable unskilled personnel to adjust the bore size with precision.

8 Claims, 6 Drawing Figures

BORING TOOL

The invention is concerned with cutting tools and more particularly with boring tools which can be adjusted without the necessity of making intricate and precise measurements.

Boring tools are one of the tools that are normally used only by precision machinists. Accordingly, skilled workmen are generally required to set the radius cut by boring tools. For example, in use, the radius described by the cutting edge of a boring tool is precisely measured using calipers, micrometers, and the like. A skilled machinist can bore apertures to within tolerances of about ten thousandths.

The necessity of making the precise measurements naturally opens room for error. Exceptionally careful and meticulous machinists are required to prevent errors. Such machinists are in short supply and further are high-priced. Therefore, the machine tool industry is constantly searching for methods of adjusting the boring tools to the precise measurements required without the need for the meticulous care provided by the uncommon skilled machinist. Thus, there is in the prior art, for example, eccentrically mounted boring tools wherein the mounts can be rotated to take advantage of the eccentrics and thereby vary the diameter of the aperture being bored with relative precision.

The presently available adjustable mounts, however, have many shortcomings. Among the shortcomings is that the presently available eccentrically mounted boring tools use slots which retard the effective rotation of the adjustable mounts and, accordingly, unduly restrict variations in the size of the bores that can be machined by the tool. Thus, a wide series of adjustable mounts have to be used to provide the required dimensional differences. In addition, to obtain even the relatively small differences in radii, the presently available eccentrically mounted boring tools are relatively large and cumbersome.

Accordingly, an object of the present invention is to provide new and unique boring tools.

A related object of the present invention is to provide new and unique boring tools wherein a person, who is not a skilled machinist, can easily manipulate the tool to vary the radius of the bore within the close tolerances normally previously only obtainable through the services of a skilled machinist.

Another related object of the present invention is to provice boring tools wherein the radius of the aperture being bored is readily varied through the use of an off-centered, or eccentric hole in the boring tool shaft. The tool holder mounts in the accentric hole so that rotating the tool holder, causes variations in the radius of the bore.

Another related object of the invention is to provide boring tools capable of being used for varying the radii of bores by rotating the actual tool holder and the cutter up to a full 360 degrees.

Another object of the present invention is to provide new, unique, reliable and easily used boring tools which do not require the services of a skilled, high-priced machinist to make accurate bores within ten thousandths of an inch or better.

In accordance with the preferred embodiment of the above invention, a boring tool is provided with the tool shaft having a radially eccentric longitudinal aperture at one end thereof. A tool holder fits into the eccentric aperture so that when the tool holder is rotated, the distance of the cutting edge of the tool from the longitudinal axis of the shaft varies thereby varying the bore diameter. An interface collar is rotatably mounted between the tool holder and the bottom of the eccentric aperture. The tool holder is attached to the interface collar and, therefore, is eccentrically rotatable about the axis of the shaft. However, by tightening the attachment of the interface collar against the tool holder, frictional forces are applied which prevent the rotation of the tool and the tool holder so that boring can be accomplished.

When the tool holder is rotated with the interface collar in the eccentric hole to vary the radii, index markings on the tool holder and the shaft are aligned. When the index marks are aligned, an indication of the radius of the bore which the boring tool will provide at that setting is provided. Thus, the tool holder is rotated until the desired setting is obtained, after which the tool holder is tightened against the interface collar, so that rotation is prevented and the tool is ready for use. Precision measuremenrs and the services of skilled machinists are not required.

The above-mentioned and other features and objects of this invention, and the manner of obtaining them will become more apparent, and the invention itself will be best understood with reference to the following description of the embodiments of the invention, taken in conjunction with the accompanying drawings, wherein.

DETAILED DESCRIPTION OF THE DRAWINGS

Figure 1:
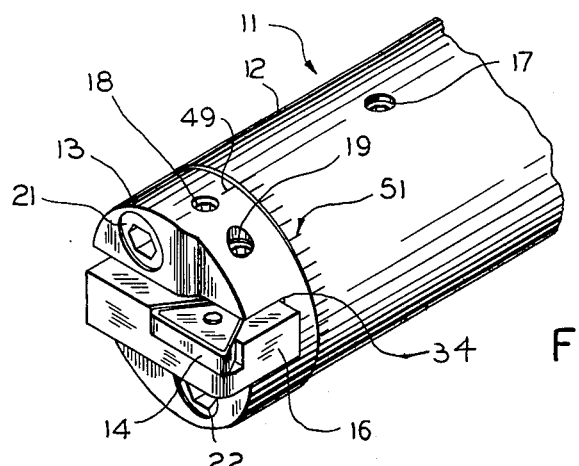
FIG. 1 is a pictorial drawing of a boring tool manufactured in accordance with this invention.

FIG. 1 shows a boring tool 11, comprising a boring tool shaft 12, having a tool holder portion 13 holding a cutting tool 14, attached in a cutting tool mount 16. The surface 15 of shaft 12 abuts the tool holder portion 10. Visible on the shaft 12 is a threaded locking screw aperture 17.

The tool holder 13, is shown as having a pair of set screws 18 and 19, used for locking the cutting tool mount 16 in place. Also visible and extending parallel to the axis of the boring tool are a pair of fastening means, such as Allen head screws 21 and 22, placed on opposite sides of tool holder slot 34.

Figure 2:
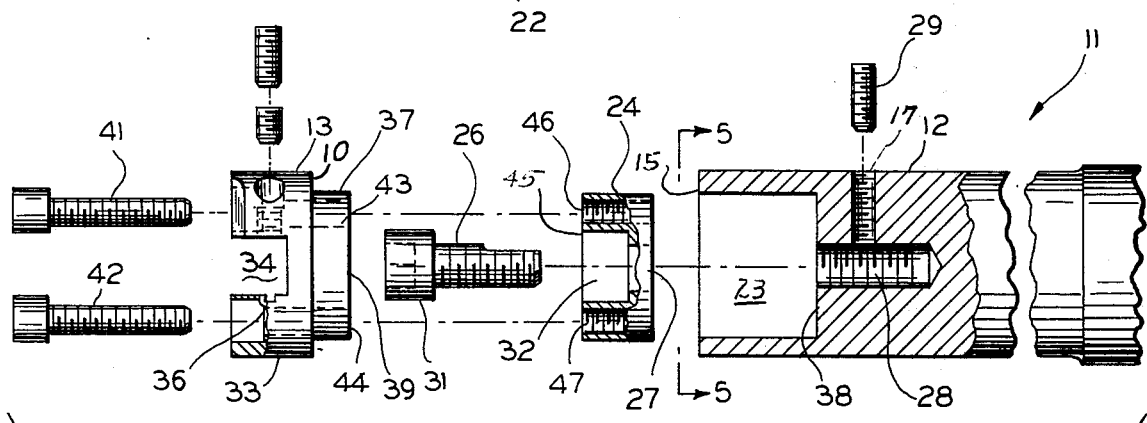
FIG. 2 is an exploded partial sectional view of the boring tool of FIG. 1, with the cutting tool removed.
Figure 5:
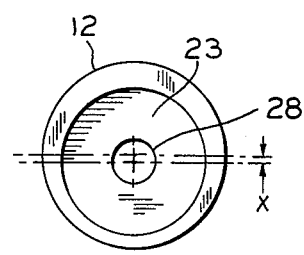
FIG. 5 is a view, looking directly at the aperture end of the boring tool, with the holder and collar removed, as shown in FIG. 2, by arrows 5—5.

As is seen further, particularly in FIGS. 2 and 5, eccentric means are provided. More particularly, there is a radially eccentric longitudinal aperture 23 at one side of the shaft 12, of the boring tool 11. The center of eccentric aperture 23 is displaced from the axis of the shaft by an amount "X" best seen in FIG. 5. Because of the eccentricity of the aperature 23, anything rotating contiguous to the periphery of aperture 23 will also rotate eccentrically relative to the axis of the shaft.

Means are provided for rotatably mounting the tool holder to the shaft. More particularly, an interface collar means 24 slipfits into hole 23 rotatably mounted therein and is fastenable to the tool holder. The collar is dimensioned to be shorter than the depth of hole 23 in the preferred embodiment of the invention.

Means are provided to act as an axle for the rotation of the interface collar. More particularly, a main screw means 26 slips through an aperture 27 at the bottom of interface collar 24, and is threaded into a threaded hole 28 in the shaft 12 of the boring tool 11. The longitudinal dimension of the portion of the collar below the head 31 of the main screw 26 and the threaded hole 28 is preferably shorter than the length of the threaded portion of the main fastener 26, so that when the main fastener 26 is screwed into hole 28, the interface collar 24 is loosely held and can still still rotate around the shaft of the fastener 26.

Means are provided for locking fastener 26 in place to prevent any vibrations from loosening the fastener 26. More particularly, a locking screw 29 screws into aperture 17 and locks main screw 26 in threaded aperture 28, notwithstanding the vibrations transmitted through the boring tool in the actual boring operations. The head 31 of fastener 26 slip-fits in cut-out 32 of interface collar 24.

Means are provided for holding the cutting tool onto the boring tool shaft. More particularly, a tool holder 31 is shown as having a main tool holding section 33. The tool holding section includes a slot 34 into which the tool mount 16 fits. Notice that slot 34 also includes sub-slot 36, which is designed to accommodate a key member on tool mount 16.

The tool holder 13 also includes, besides the main tool holding section, a neck section 37, which is dimensioned to slip-fit within aperature 23 above interface collar 24 with surface 10 abutting surface 15 and side 39 spaced apart from the side 45 of interface collar 24. The collar is juxtaposed to the end 38 of aperture 23.

Means are provided for affixing the collar 24 to prevent rotation. In one preferred embodiment, this is accomplished by pulling the surface 10 of the tool holder 13 into a contiguous position against surface 15 of shaft 12. The means for affixing the collar to prevent rotation is shown in the described embodiment as a pair of fasteners 41 and 42, which fit through apertures 43 and 44, respectively, in tool holder 13. The threaded fasteners 41 and 42 are received in threaded apertures 46 and 47, respectively, in collar 24. As the fasteners 41 and 42 are tightened, the surface 10 of the tool holder 13 is pulled into contiguous locking relation with surface 15 of the shaft 12. At the same time, tension is applied to collar 24 and the distance between surfaces 45 of the collar and 39 of the tool holder are minimized. Thus, the collar is pulled against the bottom of head 31 of main screw 26. The main locking forces, however, in this embodiment, are generated at the contiguous surfaces 10 and 15 to prevent the tool holder from rotating.

Figure 3:
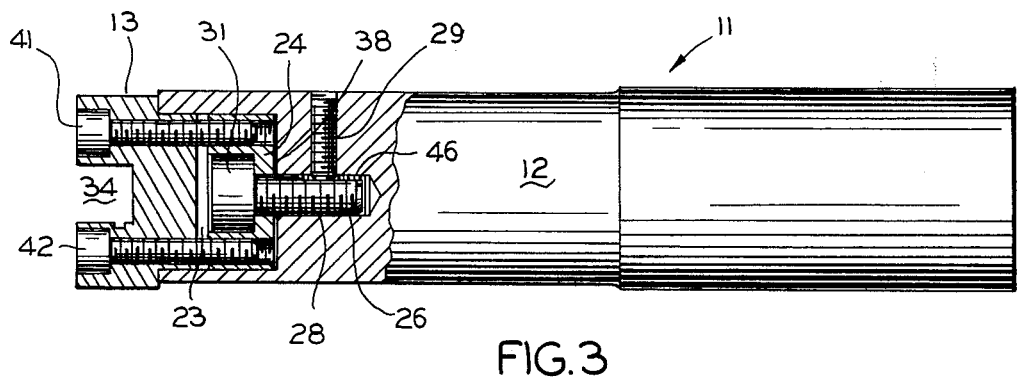
FIG. 3 is a partial sectional side view of the top section of the assembled boring tool of FIG. 1.

In FIG. 3, the boring tool is shown in assembled form with a partial sectional side view to be able to more thoroughly show and display the interaction of the various elements. It is clear in FIG. 3 that the fasteners 41 and 42 extend through the tool holder 13 and into the interface collar 24 which is located in the eccentric aperture 23 at one side of the shaft 12 of the boring tool. The collar 24 in its rotational mode is held juxtaposed to surface 38 at the bottom of the aperture 23 by main fastener 26. It should be noted that the main fastener 26 is shown having a flat surface 46 on its threaded shaft for receiving the bottom of the locking screw 29 thereagainst to assure that main fastener 26 does not rotate during the machining operation. The collar 24 is rotatable about the main fastener 26 in the aperature 23 along with the tool holder 13 when fasteners 41, 42 are not tightened. The tool holder is shown with the gap 34 into which the tool mount 16 and tool 14 are placed. When the fasteners 41 and 42 are tightened, then the collar 24 is pulled up against the head 31 of main fastener 26. This prevents rotation of the interfacing collar and, accordingly, rotation of the tool holder itself. With fasteners 41 and 42 tightened and pulling collar 24 up against the head 31 of main fastener 28, the tool is ready to be used for boring.

When re-adjusting or resetting the boring diameter, then the fasteners 41 and 42 are loosened sufficiently to enable rotation of the collar 24 about the main fastener 26 until the index mark 49 on the tool holder 13 is aligned with one of the index marks 51 on the main shaft of the boring tool 11. Then, fasteners 41 and 42 are once again tightened to prepare the boring tool for boring.

The rotation of the tool holder with its neck portion 37 abutting the inside of aperture 23 varies the amount of protrusion of the edge of the cutting tool 14 from the outer periphery of the shaft. The variation in the protruding distance is caused by the eccentricity of the aperture 23.

In a preferred embodiment of the boring tool, the eccentricity "X" (FIG. 6) is ten-thousandths of an inch. In that embodiment, each of the index marks 48 on the main shaft of the boring tool indicates a one-thousandth size adjustment in the diameter of the bore. Thus, when index mark 49 is moved to align with a next sequential one of the marks 51 on the main shaft, then the diameter of the bore changes by one-thousandths of an inch. Thus, it is simple even for a relatively non-skilled worker to adjust the diameter of bore to the same precision as a skilled machinist and in a shorter time than it would take for the skilled machinist.

Figure 4:
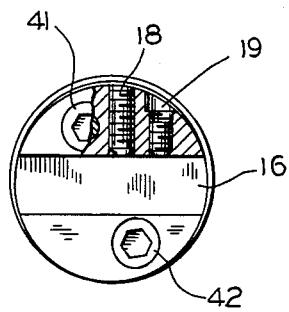
FIG. 4 is a partial sectional end view of the boring tool as shown in FIG. 3.
Figure 6:
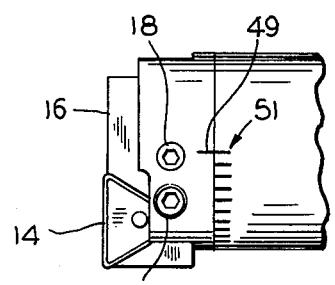
FIG. 6 is a showing of the interface between the tool holder and the boring tool shaft showing index markings thereon used for setting the radius of bore.

The cutting tool mount unit 16 is held in place by means such as locking screws shown as 18 and 19 in FIGS. 1, 4, and 6.

In use, the cutting tool is set to approximately 0.020 of an inch under the size of the diameter to be bored. The actual boring size is then set by loosening screws 41 and 42 rotating the tool holder 13 to move index line 49 a desired one of the lines 51 to bring the cutting tool out to a point where the boring tool will bore the exact diameter required. Thus, the boring tool provided has a tool holder which can be rotated 360° and the rotation is indexed to provide precision calibrated circles of varying diameters. This enables those relatively unskilled in the machining arts to operate with the speed, efficiency, and accuracy of the skilled machinists.

While the above principles of the above invention have been described in connection with specific apparatus, it is to be clearly understood that this description is made only by way of example and not as a limitation on the scope of the invention.

What is claimed is:

1. An improved boring tool, said boring tool comprising:
   a main shaft;
   said main shaft having a longitudinal axis;
   eccentric means at one end of said main tool shaft being radially eccentric relative to the said longitudinal axis;
   tool holder means holding a cutting tool for boring purposes;
   locking means for locking said tool holder to said shaft so as to prevent movement of said tool holder axially and radially relative to said shaft, whereby chatter is prevented; and collar means including said locking means coupled to said tool holder means and rotatably mounted in said eccentric means to enable said tool holder means to continuously rotate through 360 degrees, thereby continuously varying the distance from the edge of the cutting tool to the axis of said shaft as said tool holder means is rotated.

2. An improved boring tool, said boring tool comprises:

a main shaft, said main shaft having a longitudinal axis;

an eccentric longitudinal aperture at one end of said shaft, tool holder means for holding a cutting tool for boring purposes and characterized to fit into at least a portion of said eccentric longitudinal aperture, the said axis of said aperture being displaced from an axis of said shaft by the fixed amount, whereby when said tool holder rotates in said aperture, the distance from the cutting edge of said tool to the axis of said main shaft varies;

interfacing collar means for rotatably coupling said tool holder means in said eccentric aperture, means for attaching said tool holder to said interfacing collar means, tool holder locking means including said interfacing collar for locking said tool holder to said shaft to prevent axial or radial movement of said tool holder relative to said shaft, main screw means having a threaded portion for rotatably mounting said interfacing collar in said eccentric aperture, an aperture through said interfacing collar for enabling the threaded portion of said main screw means to pass through said interfacing collar, threaded aperture means in said main shaft for receiving the threaded portion of said main screw means, and means for locking said main screw means in place in said threaded aperture.

3. The boring tool of claim 2, wherein said means for locking said main screw means in said threaded aperature comprises a set screw transversing at least a portion of said threaded aperture for abutting said main screw means in said threaded aperture thereby locking said main screw means in place.

4. The boring tool of claim 2, wherein said means for locking said tool holder in place includes means for displacing said interfacing collar toward said tool holder to force said interfacing collar against the head of said main screw means, and for forcing said tool holder against said main shaft thereby preventing the rotation of said tool holder.

5. An improved boring tool having a main shaft, tool holder means attached to said main shaft for holding the cutting tool, the improvement being characterized in this, that there is provided:

interfacing collar means rotatably attached to said main shaft means and continuously rotatable through 360°, means for attaching said tool holder means to said interfacing collar means so that said tool holder means can be made to rotate with said interfacing collar means, means including said interfacing collar means for locking said tool holder to said shaft to prevent axial or radial movement of said tool holder relative to said shaft, and means for varying the diameter of the cut responsive to the rotation of said tool holder means relative to said shaft.

6. The improved boring tool of claim 5, wherein said improvement further comprises means for locking said tool holder in place, and means for indexing said rotation whereby the diameter can be set according to said indexing and said tool holder can then be locked in place.

7. An improved boring tool, said tool comprising a main shaft, said main shaft having a longitudinal axis, an eccentric longitudinal aperture at one end of said shaft, tool holder means holding a cutting tool for boring purposes and fitting into said eccentric longitudinal aperture, the said axis of said aperture being displaced from the longitudinal axis of said shaft by a fixed said amount, whereby when said tool holder is rotated in said aperture the distance from the cutting edge of said cutting tool to the longitudinal axis of said main shaft varies, shaft index markings provided on said shaft, tool holder index mark aligning means provided on said tool holder, whereby the distance of the edge of the cutting tool of said axis from said shaft can be adjusted by aligning the tool index mark aligning means and the desired one of said shaft index markings, interfacing collar means in said eccentric longitudinal aperture for rotatably coupling said tool holder means to said main shaft and enabling said tool holder means to be rotated more than 60 degrees, means for attaching said tool holder to said interfacing collar so that when said interfacing collar is rotated, said tool holder rotates, means including said interfacing collar for locking said tool holder to said shaft, said eccentric aperture having a closed end and an open end, said means for locking said tool holder to said shaft comprises tool holder locking means passing through said tool holder and fastening to said interfacing collar, means for preventing the tool holder from moving toward the closed end of said eccentric longitudinal aperture, whereby said interfacing collar is displaced by rotating said tool locking means, and means responsive to the displacement of said interfacing collar in said eccentric aperture for locking said tool holder in place.

8. An improved boring tool, said boring tool comprising:

a main shaft, said main shaft having a longitudinal axis, tool holder means for holding a cutting tool for boring purposes, an eccentric longitudinal aperture at one end of said main tool shaft for receiving said tool holder, the axis of said eccentric longitudinal aperture being displaced from the axis of said shaft by a fixed amount, whereby when said tool holder rotates in said aperture, the distance from the cutting edge of the tool to the axis of said main shaft varies, interfacing collar means rotatably mounted in said eccentric means, means for attaching said tool holder means to said interfacing collar means, means for rotatably coupling said tool holder means to said eccentric means, while enabling said tool holder means to be rotated more than 60°, thereby varying the distance from the edge of said cutting tool to the axis of said shaft as said tool holder means is rotated;

said shaft having index markings thereon;

tool holder index mark aligning means provided on said tool holder, whereby the distance of the edge of the cutting tool from said axis of said shaft can be adjusted by aligning the tool holder index mark aligning means and a desired one of said shaft index markings; and locking means for locking said tool holder to said shaft so as to prevent movement of said tool holder axially or radially relative to said shaft, whereby chatter is prevented.

* * * * *

UNITED STATES PATENT AND TRADEMARK OFFICE
CERTIFICATE OF CORRECTION

PATENT NO. : 4,120,599
DATED : October 17, 1978
INVENTOR(S) : Norman H. Lovendahl It is certified that error appears in the above-identified patent and that said Letters Patent are hereby corrected as shown below:

Col. 1, Line 52          Change "accentric", should be --eccentric--.

Col. 3, Line 24          Change "holder 31", should be --holder 13--.

Signed and Sealed this

Third Day of April 1979

[SEAL]

Attest:

RUTH C. MASON
Attesting Officer

DONALD W. BANNER
Commissioner of Patents and Trademarks